United States Patent [19]

Ohsuga et al.

[11] Patent Number: 5,765,524
[45] Date of Patent: Jun. 16, 1998

[54] INTAKE SYSTEM FOR INTERNAL COMBUSTION ENGINE

[75] Inventors: Minoru Ohsuga; Takuya Shiraishi; Junichi Yamaguchi; Ryoichi Komuro; Masakichi Momono, all of Katsuta, Japan

[73] Assignee: Hitachi, Ltd., Tokyo, Japan

[21] Appl. No.: 865,186

[22] Filed: May 29, 1997

Related U.S. Application Data

[63] Continuation of Ser. No. 675,576, Jul. 3, 1996, Pat. No. 5,645,029, which is a continuation of Ser. No. 336,203, Nov. 4, 1994, Pat. No. 5,564,384.

[30] Foreign Application Priority Data

Nov. 8, 1993 [JP] Japan ............... 5-278649

[51] Int. Cl.⁶ .................................. F02B 31/00
[52] U.S. Cl. ........................................ 123/306
[58] Field of Search ........................ 123/306, 308, 123/432, 188.14

[56] References Cited

U.S. PATENT DOCUMENTS

| | | | |
|---|---|---|---|
| 4,574,751 | 3/1986 | Sugiyama et al. | 123/306 |
| 4,708,097 | 11/1987 | Hatamura et al. | 123/306 |
| 4,763,624 | 8/1988 | Deckers | 123/432 |
| 5,094,194 | 3/1992 | Rushi, II et al. | 123/306 |
| 5,133,307 | 7/1992 | Kurihara | 123/306 |
| 5,150,669 | 9/1992 | Rush, II et al. | 123/306 |
| 5,165,374 | 11/1992 | Chapman et al. | 123/308 |
| 5,168,839 | 12/1992 | Hitomi et al. | 123/432 |
| 5,186,139 | 2/1993 | Matsura | 123/306 |
| 5,245,964 | 9/1993 | Matsuo et al. | 123/306 |
| 5,261,372 | 11/1993 | Traeger et al. | 123/357 |
| 5,261,375 | 11/1993 | Rush, II et al. | 123/470 |
| 5,435,283 | 7/1995 | Zehr | 123/306 |

FOREIGN PATENT DOCUMENTS

| | | | |
|---|---|---|---|
| 137393 | 9/1984 | European Pat. Off. | 123/306 |
| 523027 | 7/1992 | European Pat. Off. | 123/306 |
| 2921300 | 12/1979 | Germany | 123/306 |
| 3338653 | 5/1985 | Germany | 123/306 |
| 3711859 | 10/1987 | Germany | 123/306 |
| 60-230543 | 11/1985 | Japan | 123/306 |
| 5156953 | 6/1993 | Japan | 123/306 |
| 2242228 | 3/1990 | United Kingdom | 123/306 |

OTHER PUBLICATIONS

Abstract—58-128412, JP Published Aug. 1, 1983 Atago, Takeshi.
Patent Abstracts of Japan—JP63100269—Published May 02, 1988, Yoshiaki, Asayama.
Patent Abstracts of Japan, JP 1106973 published Apr. 24, 1989, Kazuhiko, M.
Abstract—61-187520, JP Published Aug. 21, 1986, Uedaio, Kazuhiko.
Abstract—60-159331, JP Published Aug. 20, 1985, Hatamura, Kouichi.

*Primary Examiner*—Raymond A. Nelli
*Attorney, Agent, or Firm*—Antonelli, Terry, Stout & Kraus, LLP

[57] ABSTRACT

An air intake system for an internal combustion engine uniformly distributes the fuel-air mixture in the cylinder, and concentrates the mixture in the vicinity of an ignition plug in the cylinder by selecting the direction of supply of sprayed fuel, thereby improving ignitability of the mixture at the time of lean-burn operation. The system produces tumble flow in the cylinder for accelerating combustion and provides lean-burn operation, thereby suppressing consumption of the fuel and reducing the amount of exhaust gas.

The fuel is injected by a fuel injection valve and collides with an intake valve, before being atomized. The atomized fuel flows into the cylinder from the side of the intake valve closer to the fuel injection valve. On the other hand, high-velocity air flow from bypass passages enters the cylinder from the side of the intake valve closer to the ignition plug, so as to produce tumble flow in the cylinder.

1 Claim, 15 Drawing Sheets

$$\text{FLOW DIVISION RATIO} = \frac{Qb}{Qm+Qb} \times 100$$

F I G. 10
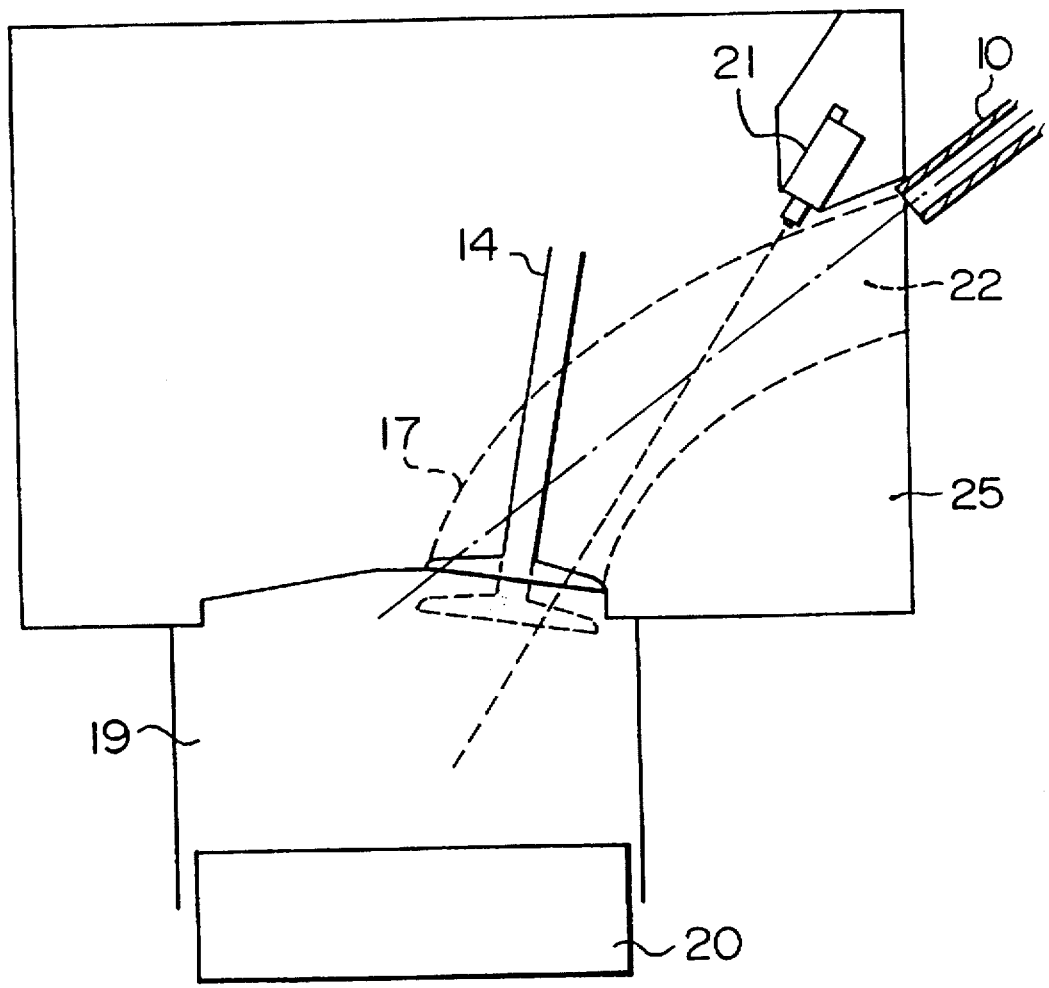

F I G. 14
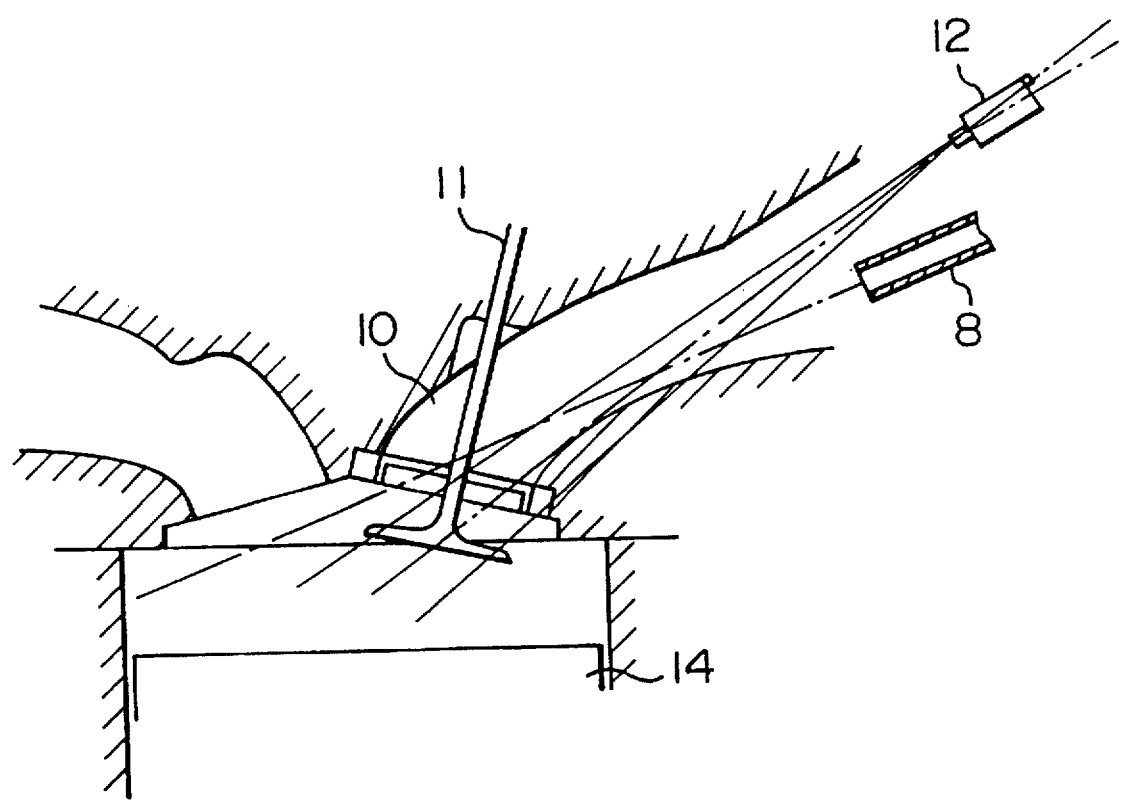

F I G. 16A
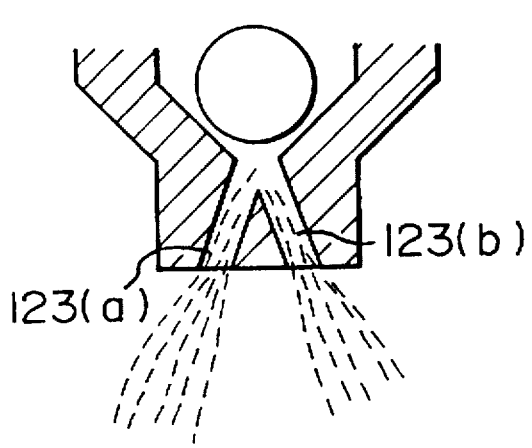
F I G. 16B
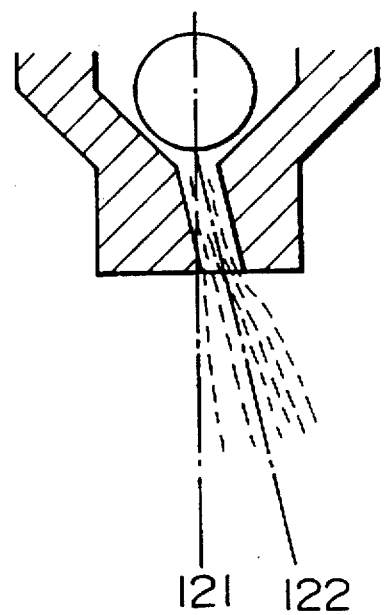
F I G. 17A
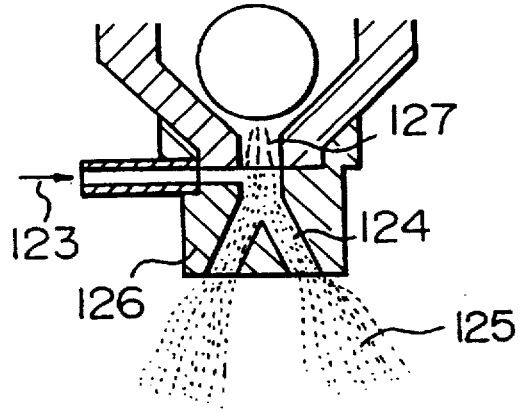
F I G. 17B
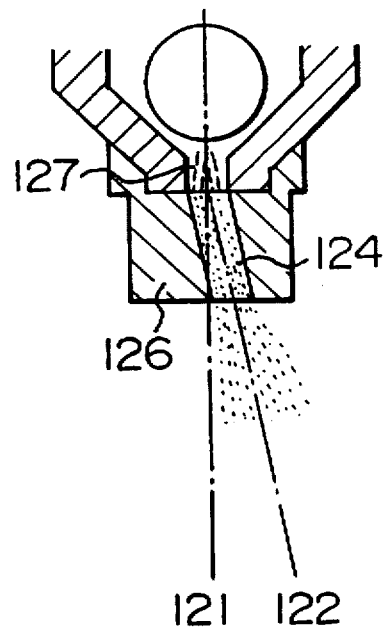

INTAKE SYSTEM FOR INTERNAL COMBUSTION ENGINE

This application is a Continuation of application Ser. No. 08/675,576, filed Jul. 3, 1996, now U.S. Pat. No. 5,645,029 which is a Continuation of application Ser. No. 08/336,203, filed Nov. 4, 1994.

BACKGROUND OF THE INVENTION

1. Field of the Invention

The present invention relates to an intake system of an internal combustion engine including a fuel injection valve for injecting fuel to an intake port of the engine, and an intake air-flow deflection mechanism which serves to deflect flow of intake air so as to produce vortex flow in a cylinder of the engine, and more particularly, to an intake system appropriate for lean-burn operation of an internal combustion engine.

2. Description of the Prior Art

In a conventional intake system of an internal combustion engine, as disclosed in Japanese Patent Unexamined Publication No. 60-230543, flow of intake air is deflected. However, according to the conventional system, strong vortex flow is not produced in a cylinder of the engine because the deflected intake air flow lack orientation or directivity. Further, since fuel is sprayed into the deflected air flow, the direction of injection of the fuel is unfavorably changed so that the fuel cannot be supplied to a target position. Consequently, the fuel sticks to a wall of an intake pipe and flows into the cylinder in the state of liquid, which results in non-uniformity of the fuel-air mixture distribution in the cylinder. Thus, lean-burn operation of the engine cannot be realized.

In view of the above, the present invention aims to prevent non-uniformity of the fuel-air mixture distribution in a cylinder of an internal combustion engine, unlike the prior art, so as to realize uniformity of the distributed fuel-air mixture, and to improve ignitability of the mixture at the time of lean-burn operation of the engine, by selecting the direction of supply of sprayed fuel in order to partially concentrate the mixture flow rich in the fuel in the vicinity of an ignition plug in the cylinder.

Further, the invention aims to prevent the fuel from being blown off by high-velocity air flow for producing tumble flow in the cylinder, which tumble flow accelerates combustion of the mixture in the cylinder.

SUMMARY OF THE INVENTION

In an intake system of an internal combustion engine according to the invention, a high-velocity air flow supply device which supplies to an intake port portion high-velocity air flow for producing tumble flow in a cylinder of the engine, is provided for supplying the high-velocity air flow having orientation at a target position of an intake valve portion, thereby producing strong tumble flow in the cylinder. A position of an injection port of the high-velocity air flow supply device is so selected that the high-velocity air flow having the specific orientation may not blow-off the fuel. Further, a nozzle hole or holes of a fuel injection valve is so constructed as to minimize the angle of spray of the fuel, in order to prevent the fuel from being blown off by the orientated high-velocity air flow and from sticking to a wall of an intake pipe.

The high-velocity air flow having an orientation enters the cylinder through the intake port during an intake stroke of the engine, so that strong tumble flow is produced in the cylinder. This tumble flow is reserved until during a compression stroke of the engine to thereby accelerate the combustion of the mixture after the ignition. Further, because the fuel is supplied above the intake valve, the fuel collides with the high-velocity air flow above the intake valve, so as to be atomized. The atomized fuel is dispersed in the cylinder while it is being conveyed by the tumble flow in the cylinder. The mixture is thus distributed uniformly in the cylinder.

According to the invention, because the fuel-air mixture is uniformly distributed or stratified in the cylinder, the ignitability of the mixture can be improved. Further, the combustion of the mixture is accelerated by the tumble flow produced in the cylinder so that stable combustion of lean mixture can be realized. Therefore, fuel consumption is suppressed and the amount of HC or NOx can be remarkably reduced.

BRIEF DESCRIPTION OF THE DRAWINGS

FIG. 10 is a diagram showing the general structure of an intake port portion and a combustion chamber according to a third embodiment of the invention;

FIG. 14 is a diagram showing the structure of an intake port portion and a combustion chamber according to a fourth embodiment of the invention;

FIGS. 16A and 16B are enlarged views of fuel injection holes of an injector valve;

FIGS. 17A and 17B are enlarged views of fuel injection holes of an injector valve;

DETAILED DESCRIPTION OF THE PREFERRED EMBODIMENTS

The present invention will be hereinafter described with reference to the attached drawings.

Figure 1A:
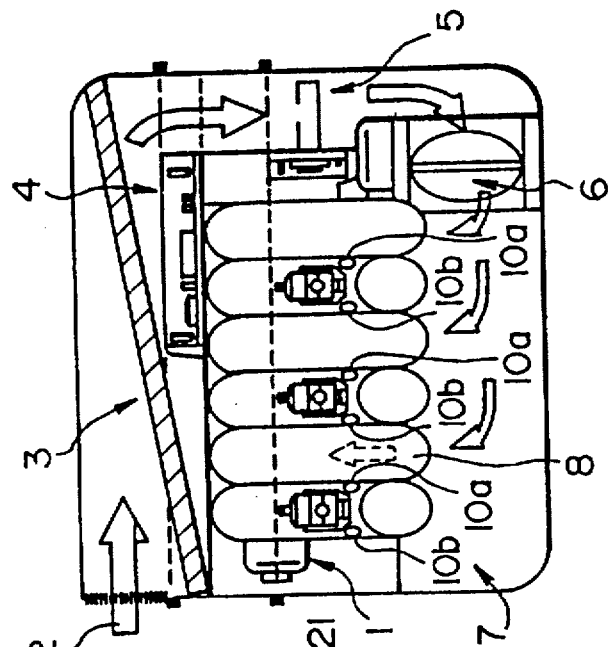
FIG. 1A is an elevational side view showing an intake system of an internal combustion engine according to a first embodiment of the present invention.
Figure 1B:
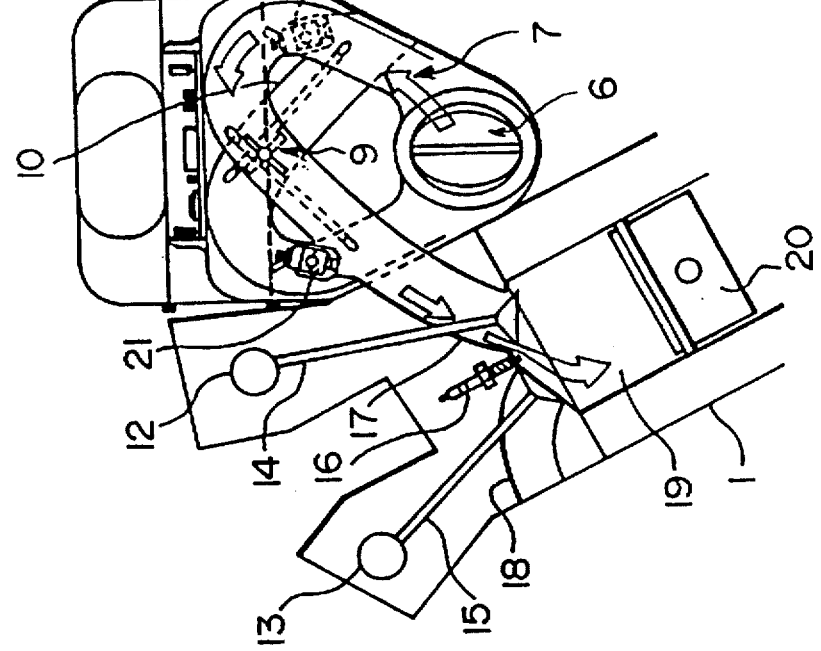
FIG. 1B is an elevational front view showing the same in cross section.

The structure of a first embodiment of the invention is shown in FIGS. 1A and 1B. In FIGS. 1A and 1B, reference numeral 1 denotes one half (e.g., a left bank) of an engine with a V-shape cylinder arrangement. When an intake cam 12 is operated, an intake valve 14 is opened, and a piston 20 is lowered. Accordingly, intake air 2 is supplied via an air cleaner 3 for removing dirt and dust from the air, an air metering section 5 for measuring the rate of the intake air, a throttle valve 6 for controlling an operation condition of the engine, and a collector 7. The intake air 2 is further supplied to a combustion chamber 19 of each air cylinder through an individual intake pipe 8 connected with an intake port 17 of the air cylinder. At this time, fuel is injected to the combustion chamber 19 from a fuel injection device 21. After the air is sucked into the combustion chamber 19, the intake valve 14 is closed, and the piston 20 is raised to compress the mixture of the air and the fuel. The fuel-air mixture is exploded by an ignition plug 16, and the piston 20 is pressed down. When an exhaust cam 13 is operated to open an exhaust valve 15, exhaust gas after the combustion is discharged out of an exhaust port 18. The individual intake pipe 8 connected with the intake port 17 of each air cylinder includes a flow dividing valve 9 and passages 10 for bypassing the intake air 2 from the collector 7 which is located upstream of the flow dividing valve 9. The bypass passages 10 supply the air to the intake port 17 from the collector 7 when the flow dividing valve 9 is closed. By passing the air through the (two) passages 10 each having a diameter of 8 mm which is sufficiently smaller than that of the flow dividing valve 9 (about 40 mm), the velocity of the intake air 2 is increased. That is to say, the velocity of the air flowing through the intake port 17 and the intake valve 14 is increased so that air flow can be formed in the combustion chamber 19. The flow dividing valve 9 can be opened/closed by driving a step motor 11 in response to a control signal from a control unit 4. When the opening degree of the throttle valve 6 is large, the opening degree of the flow dividing valve 9 is also large, thereby obtaining a high charging efficiency.

Figure 2:
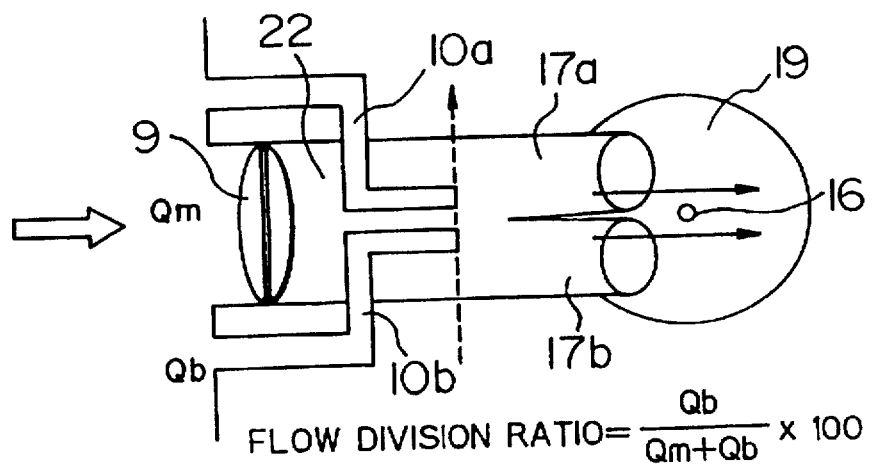
FIG. 2 is a diagram showing the structure of an intake port portion in the first embodiment from a first direction.

A portion of this system in the vicinity of the individual intake pipe 8 and the intake port 17 of each air cylinder is shown in FIG. 2 more specifically. In FIG. 2, the combustion chamber 19 of the engine 1 (on the right side of the dashed line) and the individual intake pipe 8 (on the left side of the dashed line) are viewed from the top, whereas the exhaust valve 15 and the exhaust port 18 are omitted from the illustration. During an intake stroke of the engine, the intake air 2 from the collector 7 is introduced into the combustion chamber 19 via a main intake passage 22 or the bypass passages 10. During low-load operation of the engine, the flow dividing valve 9 is closed, and the air which has bypassed the flow dividing valve 9 flows into the intake port 17 and the combustion chamber 19 at high velocity, and forms air flows called tumbles and swirls in the combustion chamber 19. The flow dividing valve 9 is opened/closed when the step motor 11 is driven in response to a control signal from the control unit 4. During high-load operation of the engine, the flow dividing valve 9 is opened so that a high charging efficiency can be obtained. Further, during middle-load operation of the engine, the flow dividing valve 9 is half-opened, thus regulating the ratio of the inflow rate Qb of the air through the bypass passages 10 and the inflow rate Qm of the air through the main intake passage 22 (the flow division ratio).

Figure 3:
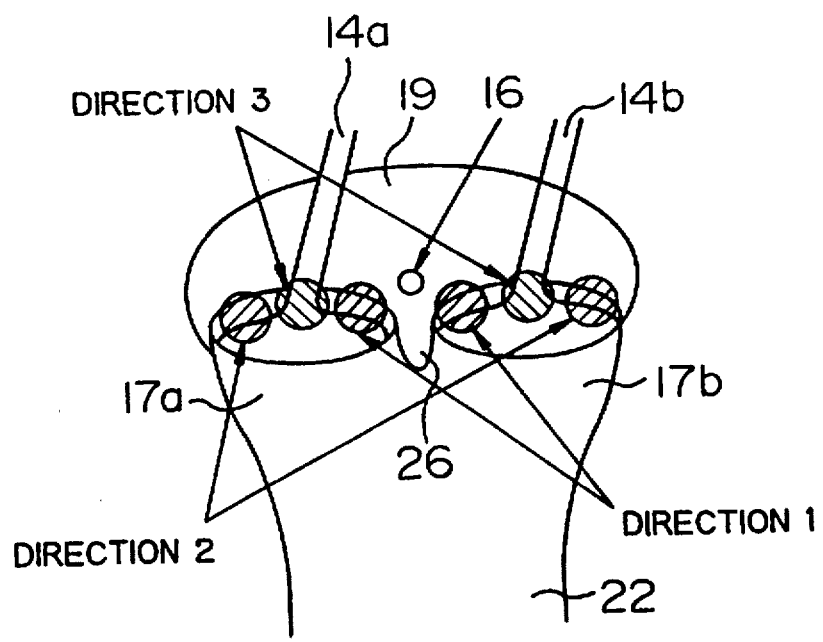
FIG. 3 is a diagram showing the structure of the intake port portion in the first embodiment from a second direction.

FIG. 3 is a diagram of the combustion chamber 19 of the engine 1, as viewed from the main intake passage 22. In FIG. 3, reference numerals 14a and 14b (hereinafter 14) denote the intake valve, and 16 denotes the ignition plug, whereas the exhaust valve 15 and the exhaust port 18 are omitted from the illustration. The bypass passages 10 (omitted from FIG. 3) attached to the individual intake pipe 8 have nozzle holes which are beforehand adjusted to face directions 1, 2 or 3 shown in FIG. 3. The directions 1 extend toward valve gaps formed between a central partition wall 26 and stems of the intake valve 14 when the intake valve 14 is lifted to the maximum degree. The directions 2 extend toward valve gaps defined between outer-side walls of the intake port 17 and the stems of the intake valve 14 when the intake valve 14 is lifted to the maximum degree. The directions 3 extend toward the proximal ends of the stems of the intake valve 14. When the nozzle holes face the directions 1, high-velocity air flow which has been supplied from the bypass passages 10 forms vertical vortex flow called tumbles in the combustion chamber 19. When the nozzle holes face the directions 2, high velocity air flows which has been supplied from the bypass passages 10 whirl along the inner wall of the combustion chamber 19 and forms horizontal vortex flows called swirls in the combustion chamber 19. The directions 3 are provided to achieve both these effects of the directions 1 and 2. The foregoing vortex flows efficiently improves mixing of the air and fuel in the combustion chamber 19.

Figure 4:
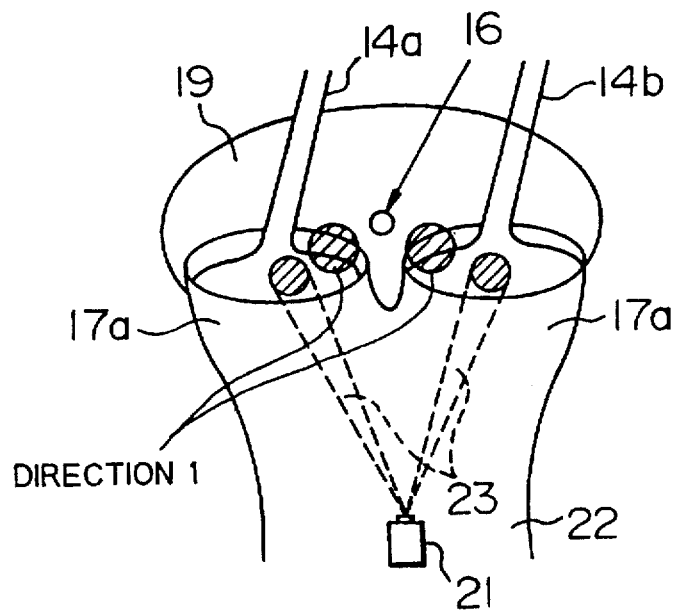
FIG. 4 is a diagram showing the structure of the intake port portion in the first embodiment.

FIG. 4, similar to FIG. 3, is a diagram of the combustion chamber 19, as viewed from the main intake passage 22. In FIG. 4, reference numerals 14a and 14b ("14") denote the intake valve, and 16 denotes the ignition plug, whereas the exhaust valve 15 and the exhaust port 18 are omitted from the illustration. An explanation will be given on the case where the nozzle holes of the bypass passages 10 are adjusted to face the directions 1. During low-load operation of the engine, the flow dividing valve 9 (omitted from FIG. 4) is closed, and consequently, the air in the collector 7 passes through the bypass passages 10. Since the nozzle holes of the bypass passages 10 face the directions 1, high-velocity air flow is supplied into the combustion chamber 19 and forms tumble flow, as described above. At this time, the fuel injection device 21 injects fuel 23 on the basis of a control signal from the control unit 4. In order to promote vaporization and atomization of the injected fuel 23, the fuel 23 is injected toward tapered portions of the intake valve 14. The fuel 23 which has collided with the tapered portions of the intake valve 14 is partially vaporized and diffused, and is mixed with the air. The rest of the fuel 23 flows into the combustion chamber 19 in the state of liquid and is vaporized and diffused in the combustion chamber 19.

Figure 5:
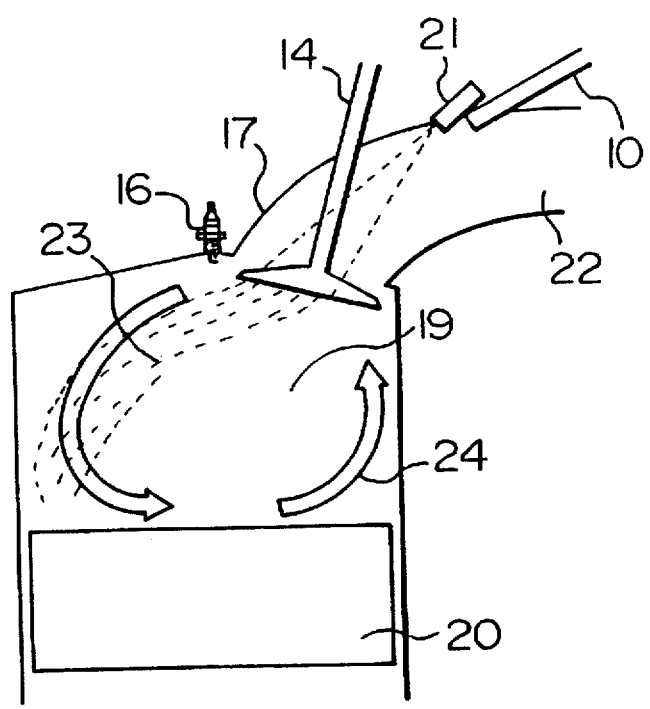
FIG. 5 is a diagram showing the structure of the intake port portion and a combustion chamber in the first embodiment at one point in the combustion cycle.

FIG. 5 is a vertical cross-sectional view of the engine 1 during an intake stroke, from which the exhaust valve 15 and the exhaust port 18 are omitted. Reference numeral 20 denotes the piston. The fuel 23, which has been injected from the fuel injection device 21 and collided with the intake valve 14 so as to be atomized, is blown off by high-velocity air flow from the bypass passages 10 in such a manner that the fuel 23 flows into the combustion chamber 19 from the side of the intake valve 14 closer to the ignition plug 16. Tumble flow 24 is formed in the combustion chamber 19.

Figure 6:
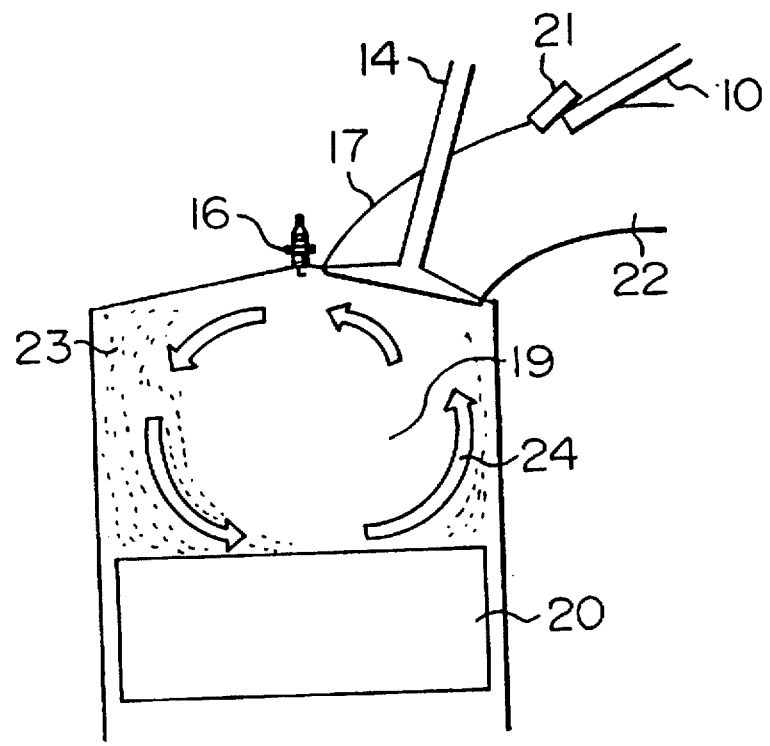
FIG. 6 is a diagram showing the structure of the intake port portion and the combustion chamber in the first embodiment at a second point in the combustion cycle.

FIG. 6 is a vertical cross-sectional view of the engine 1 during a compression stroke, from which the exhaust valve 15 and the exhaust port 18 are omitted. Reference numeral 20 denotes the piston. The tumble flow 24 which has been formed in the combustion chamber 19 during the intake stroke of the engine continues to exist during the compression stroke, and consequently, sprayed fuel 23 is blown outside of the tumble flow 24.

Figure 7:
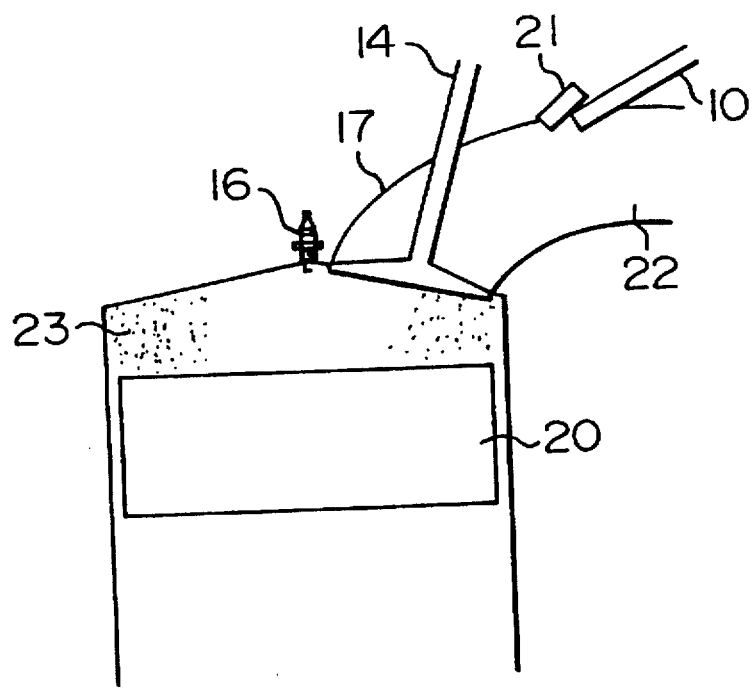
FIG. 7 is a diagram showing the operation during a compression stroke of the engine.

FIG. 7, similar to FIG. 6, is a vertical cross-sectional view of the engine 1 during the compression stroke. In a late stage of the compression stroke, the sprayed fuel 23 blown off by the tumble flow 24 exists in a peripheral portion of the combustion chamber 19.

Figure 8:
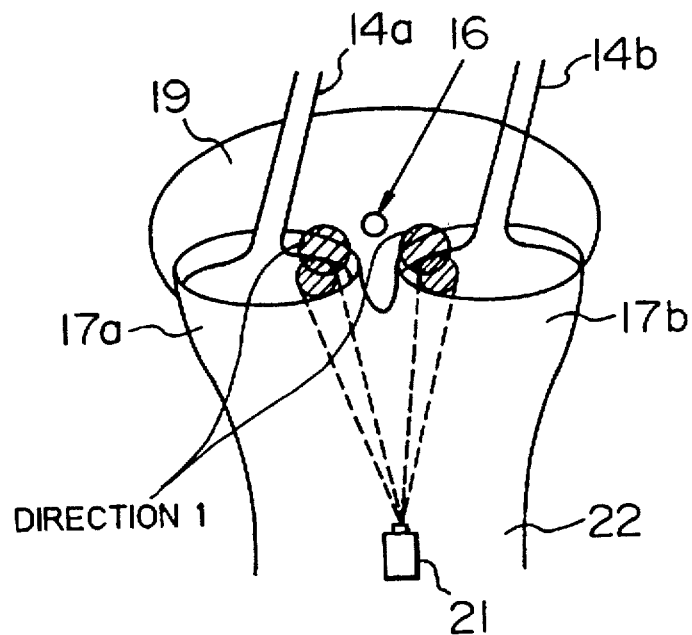
FIG. 8 is a diagram showing the structure of an intake port portion according to a second embodiment of the present invention.

A second embodiment of the present invention is shown in FIG. 8. FIG. 8 is a diagram of a combustion chamber 19 of an engine 1, as viewed from the main intake passage 22. In FIG. 8, reference numerals 14a, 14b ("14") denote an intake valve, and 16 denotes an ignition plug whereas the exhaust valve 15 and the exhaust port 18 are omitted from the illustration. An explanation will be given on the case where nozzle holes of bypass passages 10 (omitted from FIG. 8) attached to an individual intake pipe 8 are adjusted to face the directions 1 shown in FIG. 3, with a fuel injection device 21 being arranged to inject fuel between a central partition wall 26 and stems of the intake valve 14 and to cause the fuel to collide with tapered portions of the intake valve 14.

Figure 9:
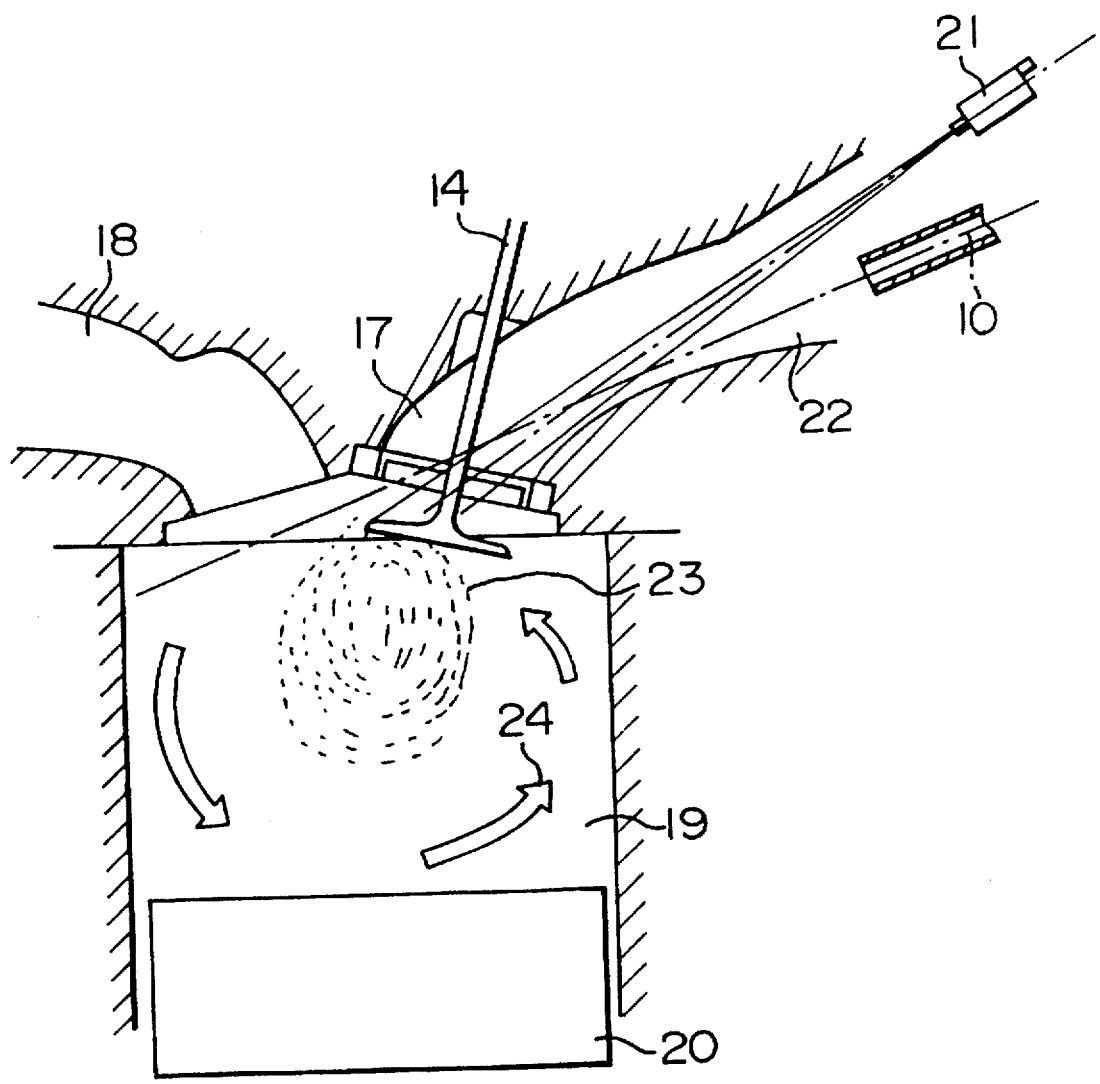
FIG. 9 is a diagram showing the structure of the intake port portion and a combustion chamber in the second embodiment.

FIG. 9 is a vertical cross-sectional view of the engine 1 of this embodiment during an intake stroke, from which the exhaust valve is omitted. Fuel 23 injected from the fuel injection device 21 collides with the tapered portions of the intake valve 14 and is atomized. The atomized fuel 23 is blown into the combustion chamber 19 by high-velocity air flow from the bypass passages 10. At this time, because the fuel 23 collides with the intake valve 14, the amount of fuel 23 which directly flows into the combustion chamber 19 through valve gaps and reaches the inner wall of the combustion chamber 19 in the state of liquid is lessened. Moreover, tumble flow 24 is formed in the combustion chamber 19, and therefore, the atomized fuel 23 is efficiently mixed with the air and uniformly distributed.

A third embodiment of the invention is shown in FIG. 10. FIG. 10 is a vertical cross-sectional view of the engine 1, from which the exhaust valve 15 and the exhaust port 18 are omitted. Reference numeral 20 denotes a piston. A fuel injection device 21 is attached to an engine head 25 and arranged at an angle in the vicinity of the combustion chamber 19.

Figure 11:
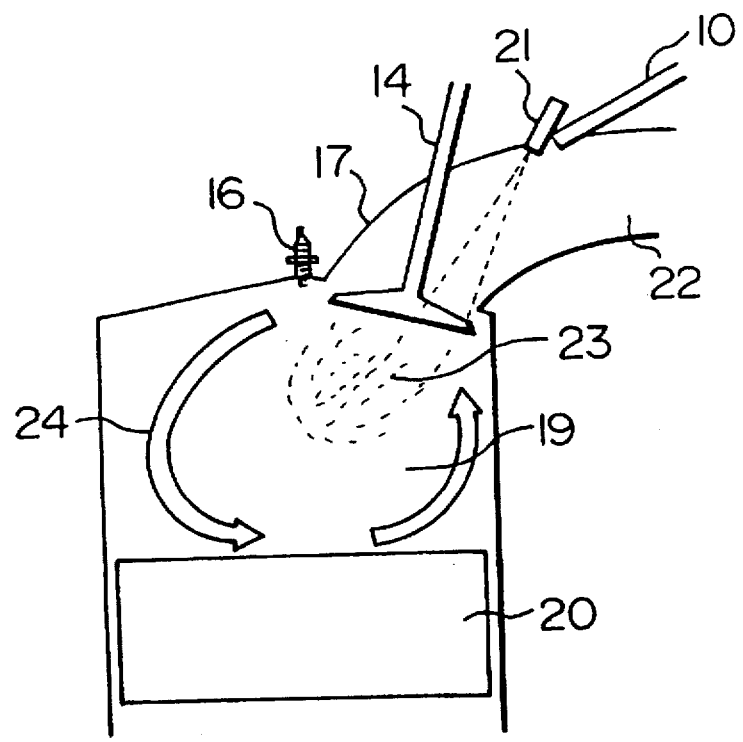
FIG. 11 is a diagram showing the structure of the intake port portion and the combustion chamber in the third embodiment at one point in the combustion cycle.

FIG. 11 is a vertical cross-sectional view of the engine 1 during an intake stroke, from which the exhaust valve 15 and the exhaust port 18 are omitted. Reference numeral 20 denotes the piston. Fuel 23, which has been injected from the fuel injection device 21 and collided with the intake valve 14 so as to be atomized, flows into the combustion chamber 19 from the side of the intake valve 14 closer to the fuel injection device 21. On the other hand, high-velocity air flow from bypass passages 10 is supplied into the combustion chamber 19 from the side of the intake valve 14 closer to the ignition plug 16 and forms tumble flow 24 in the combustion chamber 19.

Figure 12:
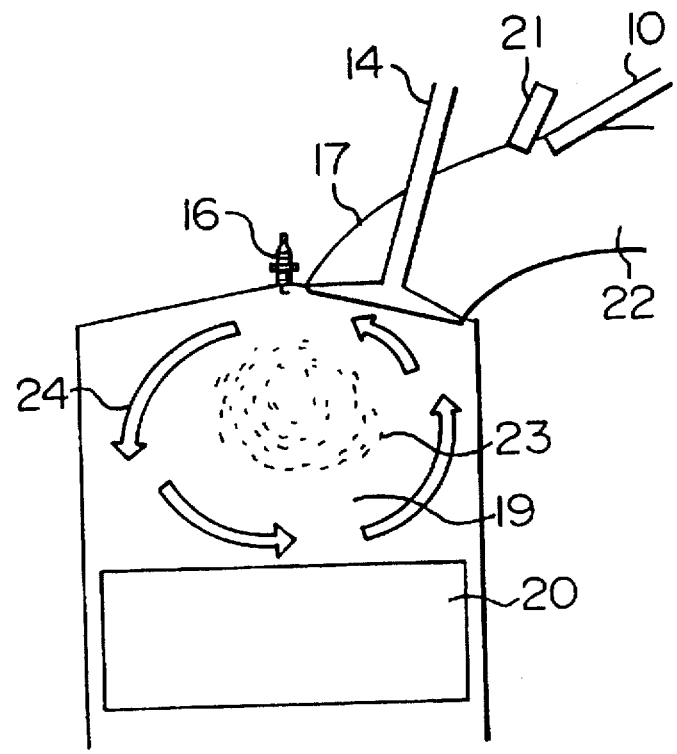
FIG. 12 is a diagram showing the structure of the intake port portion and the combustion chamber in the third embodiment at a second point in the combustion cycle.

FIG. 12 is a vertical cross-sectional view of the engine 1 during a compression stroke, from which the exhaust valve 15 and the exhaust port 18 are omitted. Reference numeral 20 denotes the piston. The fuel 23, which has been injected from the fuel injection device 21 and collided with the intake valve 14 so as to be atomized, is included by the tumble flow 24 which has been formed during the intake stroke.

Figure 13:
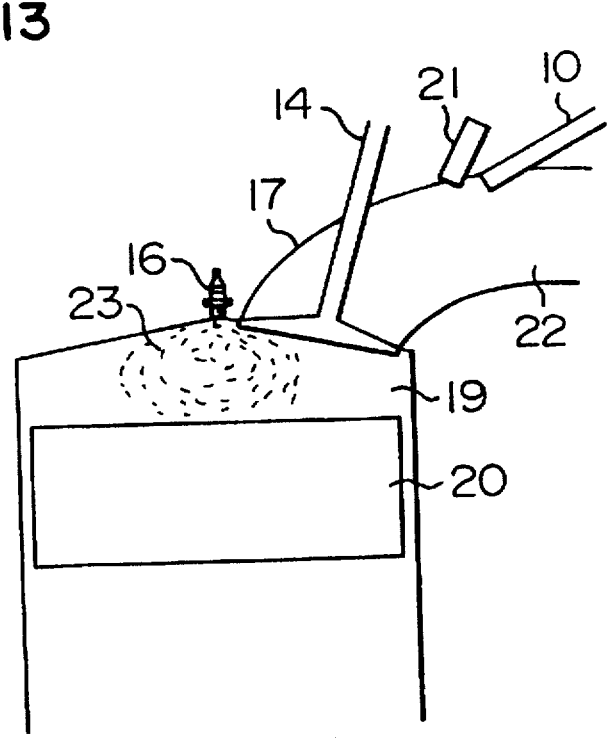
FIG. 13 is a diagram showing the operation during a compression stroke of the engine at a third point in the combustion cycle.

FIG. 13 is a vertical cross-sectional view of the engine 1 in a late stage of the compression stroke. The sprayed fuel 23, which has been included by the tumble flow 24 during the compression stroke, continues to be distributed in the vicinity of the ignition plug 16 even after the tumble flow 24 disappears. This distribution is advantageous for reliable ignition in lean-burn operation.

Figure 15A:
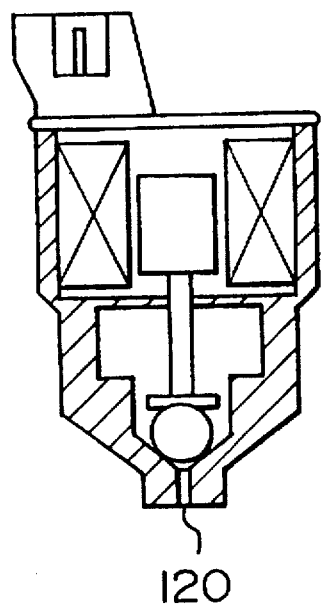
FIGS. 15A to 15C are diagrams of an injector valve.
Figure 15B:
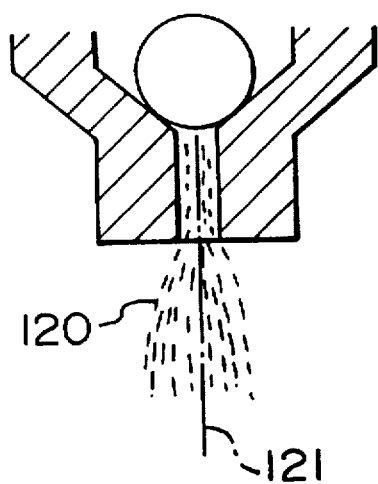
Figure 15C:
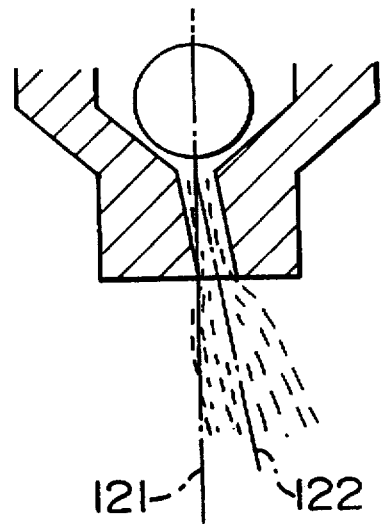

A fourth embodiment of the invention is shown in FIGS. 14 to 17. FIG. 14 is a vertical cross-sectional view of an engine, from which an exhaust valve is omitted. The direction of fuel injection by an injector 12 differs from the direction of the central axis of the injector valve 12, as shown in FIGS. 15 to 17, so that even if the injector 12 is located in the conventional position, the above-described effect can be obtained, i.e., sprayed fuel is collided with the side of an intake valve closer to an intake port, and the sprayed fuel is included by tumble flow, thereby improving the ignitability at the time of lean-burn operation. FIG. 15A shows an injector having one nozzle hole 120. FIG. 15B is an enlarged view showing the nozzle hole 120 and its neighboring portion. As viewed from this side, fuel is injected in the same direction as the central axis 121 of the injector valve. However, as viewed from a different side like FIG. 15C, the central axis 121 of the injector valve extends in a direction different from the injection direction 122 of the fuel. Thus, when the nozzle hole of the fuel extends in a direction different from that of the central axis of the injector valve, the sprayed fuel can be supplied to a desired position without considering the layout of an intake pipe and the injector valve.

FIGS. 16A and 16B show an injector having two nozzle holes 123(a) and 123(b). This injector is of the structure of an injector valve for atomization in two directions corresponding to a dual intake valve cylinder engine. FIG. 16B is a vertical cross-sectional view of the nozzle hole in two directions. As shown in FIG. 16B, the central axis 121 of the injector valve extends in a direction different from a direction 122 of the nozzle holes. In this case, the two nozzle holes likewise extend in the direction 122.

FIGS. 17A and 17B show the structure of an injector valve for introducing the air 123 to nozzle holes 124 and atomizing fuel 125. In this case, as shown in FIG. 17B, a fuel injection hole of a main body of the injector valve or a metering hole 127 extends in the same direction as that of the central axis 121 of the injector valve. However, the nozzle holes 124 of an adaptor 126 for introducing the air and dividing atomization into two directions extend in a direction different from that of the central axis 121 of the injector valve. With such an arrangement, the atomized fuel can be supplied to a desired position in a direction different from that of the central axis of the injector valve.

Figure 18:
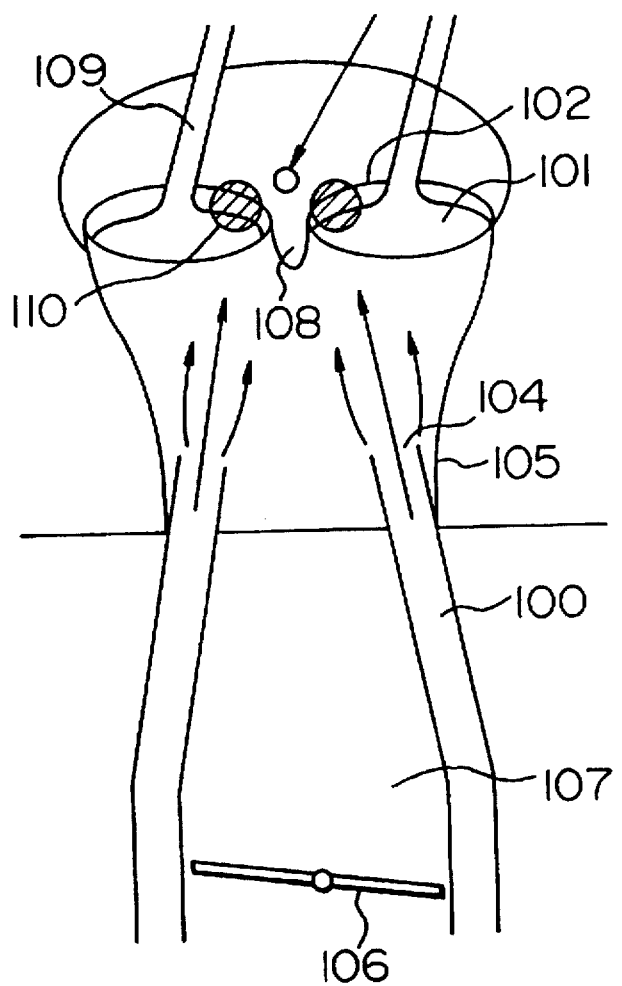
FIG. 18 is a diagram showing the structure of an intake port portion according to a fifth embodiment of the invention.

A fifth embodiment of the invention is shown in FIG. 18. A flow dividing valve 106 is provided for closing an intake passage 107 of an intake port. By closing the flow dividing-valve 106, high-velocity directive air flows are injected from passages 100. In order to aim the air flows at valve gaps at positions 110 between a central partition wall 108 and stems 109 of intake valves 101, outlets 104 of the passages 100 are opened toward the positions 110. However, if these outlets are located close to an intake pipe wall 105, areas of negative pressure are formed on the wall side, and the air flows are deflected toward the wall side. In such a condition, the air flows are dispersed and become no longer directive so that the air flows can not be aimed at the positions 110. Therefore, the outlets 104 of the passages 100 are located apart from the wall 105 so as to prevent generation of the above-mentioned wall-side air flows. With such an arrangement, the air flows injected from the outlets 104 are supplied to the predetermined positions 110 while their directions are maintained. Consequently, vortex flows are formed in the cylinder. In this embodiment, the outlets 104 of the passages 100 are projected in the air-flow directions, to thereby locate the outlets 104 apart from the wall.

Figure 19:
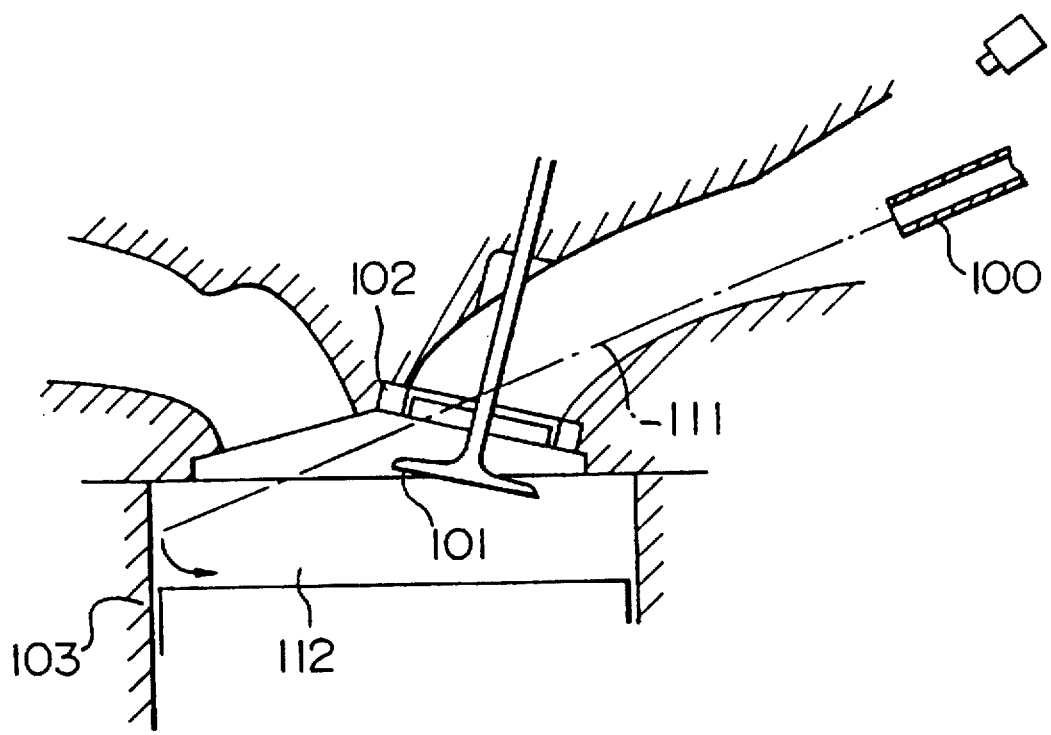
FIG. 19 is a diagram showing the structure of the intake port portion and a combustion chamber in the fifth embodiment.

FIG. 19 is a vertical cross-sectional view of the engine. An air flow 111 injected from each of the passages 100 is designed to enter the cylinder 112 from a gap between the intake valve 101 and a valve seat 102. In this case, tumble flow are formed in the cylinder 112 more easily when the air flow 111 is designed to collide with a cylinder wall 103.

Figure 20:
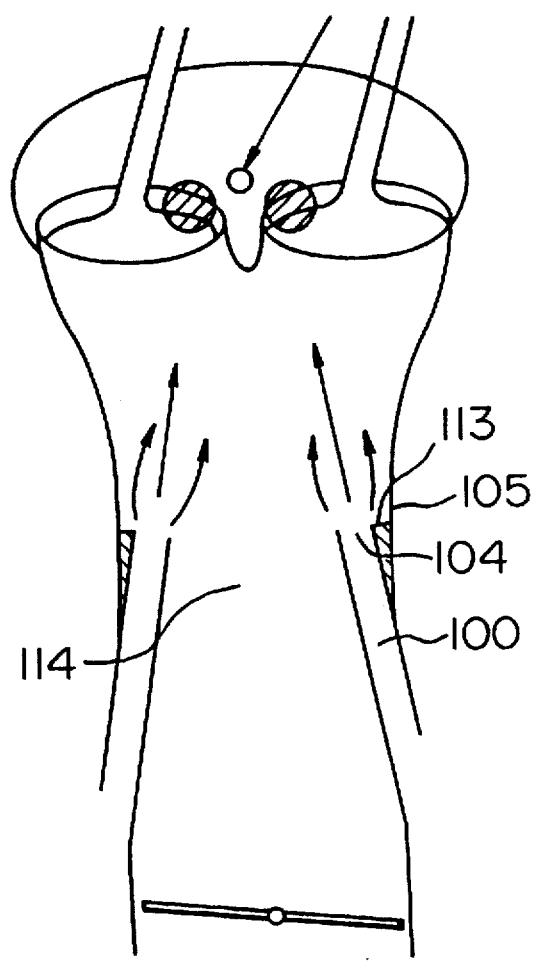
FIG. 20 is a diagram showing the structure of an intake port portion according to a sixth embodiment of the invention.

A sixth embodiment of the invention is shown in FIG. 20. In order to locate outlets 104 of passages 100 apart from the wall 105, projections 113 are formed on the wall instead of projecting the outlets 104, as shown in FIG. 18. With such an arrangement, directivity of the air flows can be maintained without projecting the outlets 104 excessively toward the intake passage 114.

Figure 21:
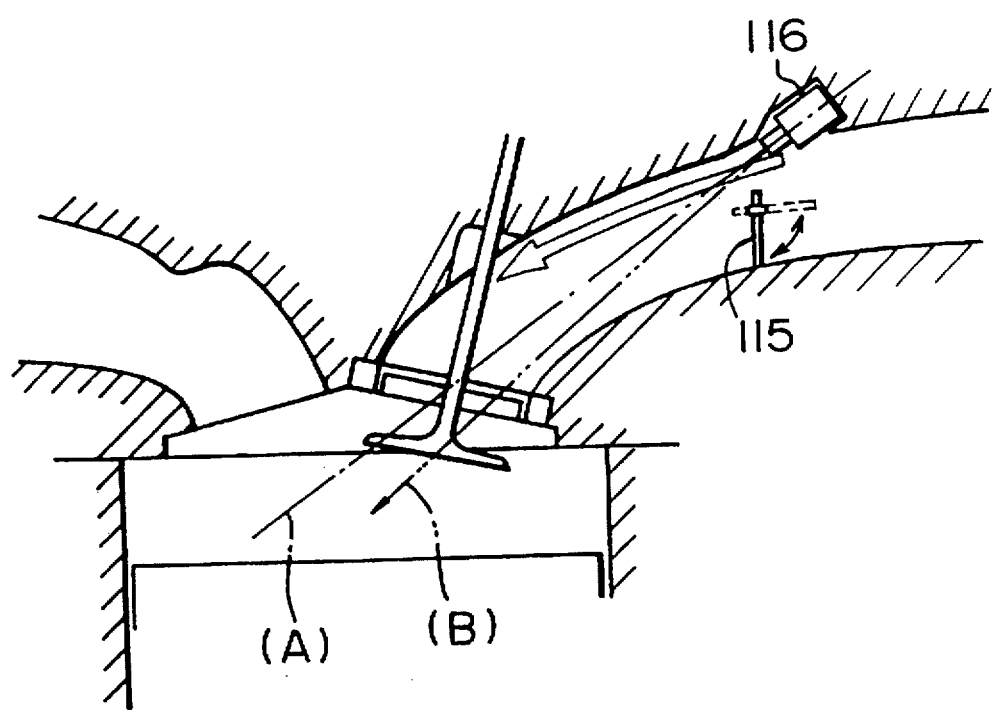
FIG. 21 is a diagram showing the structure of an intake port portion according to a seventh embodiment of the invention.

A seventh embodiment of the invention is shown in FIG. 21. In order to form vortex flow of the air in a cylinder, a valve 115 is provided in an intake passage. In such a system, the direction of an injector valve 116 is restricted in relation to the layout of the intake pipe, and consequently, it is difficult to supply sprayed fuel to a desired position. However, by use of the injector valves shown in FIGS. 15A–15C, FIGS. 16A, 16B, and FIGS. 17A, 17B, the direction of the sprayed fuel can be changed freely so that the injector valves can be provided at desired positions. In FIG. 21, the central axis of the injector valve extends in a direction A, but the injection direction of the sprayed fuel extends in a direction B.

The valve 115 is closed at the learn-burn operation, as shown by a solid line in FIG. 21. Thus, as shown by an arrow C in FIG. 21, the air flow is deflected to produce vortex flows in the cylinder of the engine. At the full load operation, the valve 115 is opened, as shown by a broken line in FIG. 21.

What is claimed is:

1. An intake system for an internal combustion engine having a combustion chamber, with an intake valve having a valve stem and a valve body for closing a combustion port of the combustion chamber, said intake system comprising:

an intake port for delivering intake air to the combustion chamber;

a flow dividing valve located in the intake port;

a fuel injection valve having at least one nozzle hole for injecting fuel to the intake port; and means for causing air in the intake port to accelerate and be directed to a valve gap between the central partition wall of the combustion port and the valve stem of the intake valve and to a valve gap between outer side walls of the combustion port and the valve stem or a lower end of the valve stem, so as to produce tumble or swirl air flow in the combustion chamber.

* * * * *